Nov. 16, 1965 A. W. DUNCAN 3,217,863
TENSIONING MEANS FOR BELT CONVEYORS
Original Filed Dec. 14, 1961 3 Sheets-Sheet 1
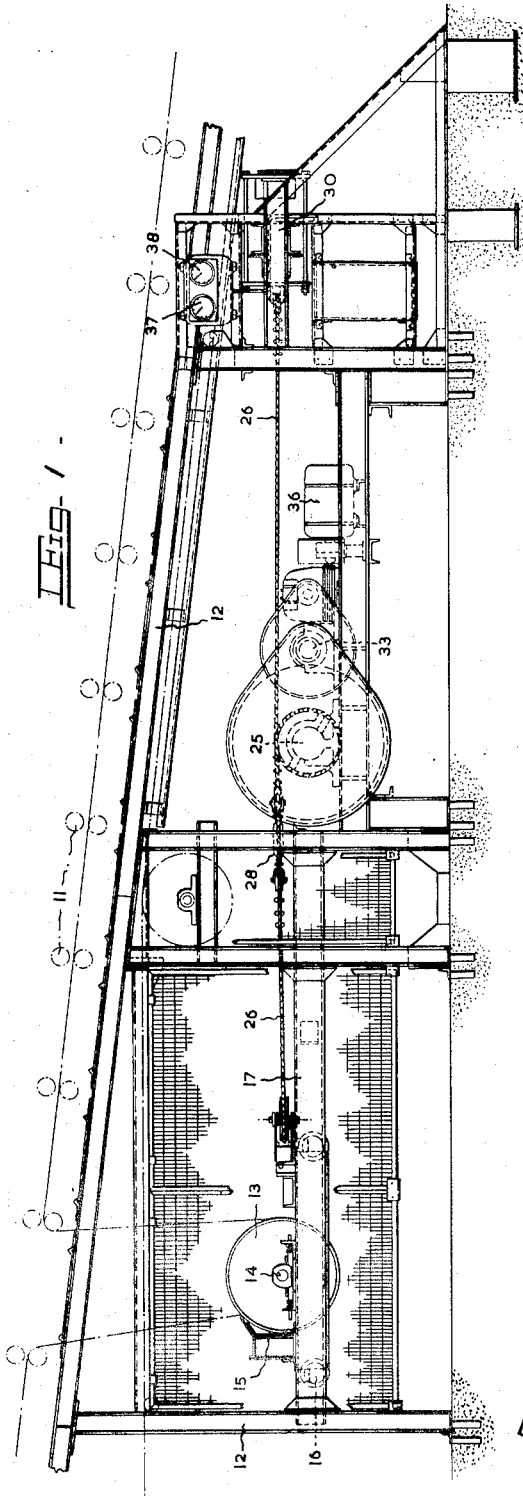
INVENTOR:
Angus Wellesley Duncan
BY: Scrivener + Parker
Attorneys

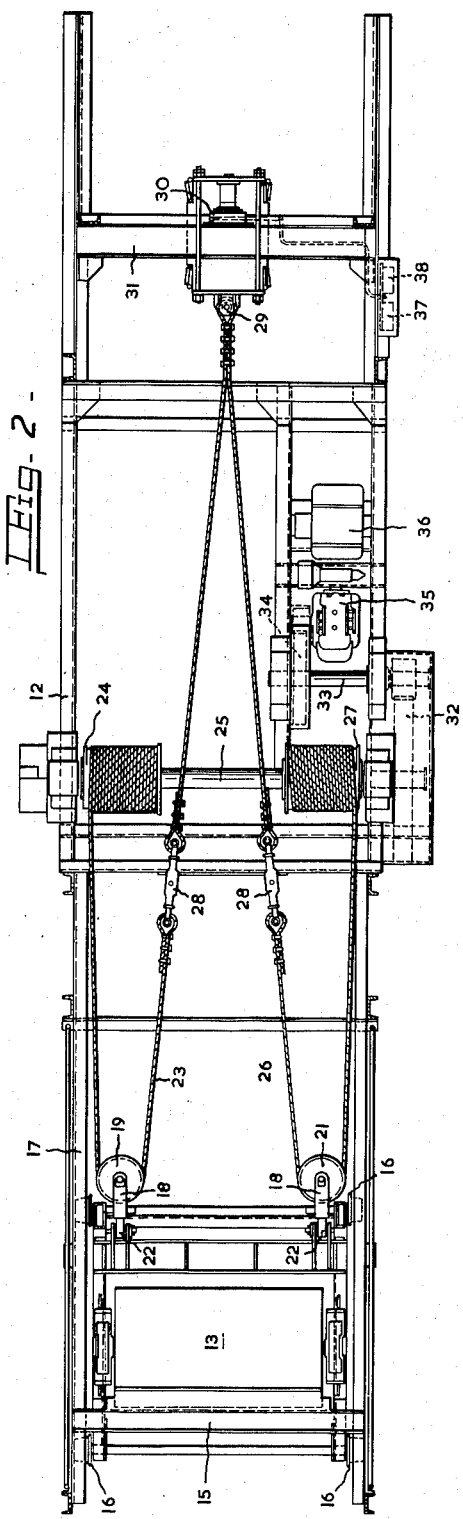

Nov. 16, 1965  A. W. DUNCAN  3,217,863
TENSIONING MEANS FOR BELT CONVEYORS
Original Filed Dec. 14, 1961  3 Sheets-Sheet 3
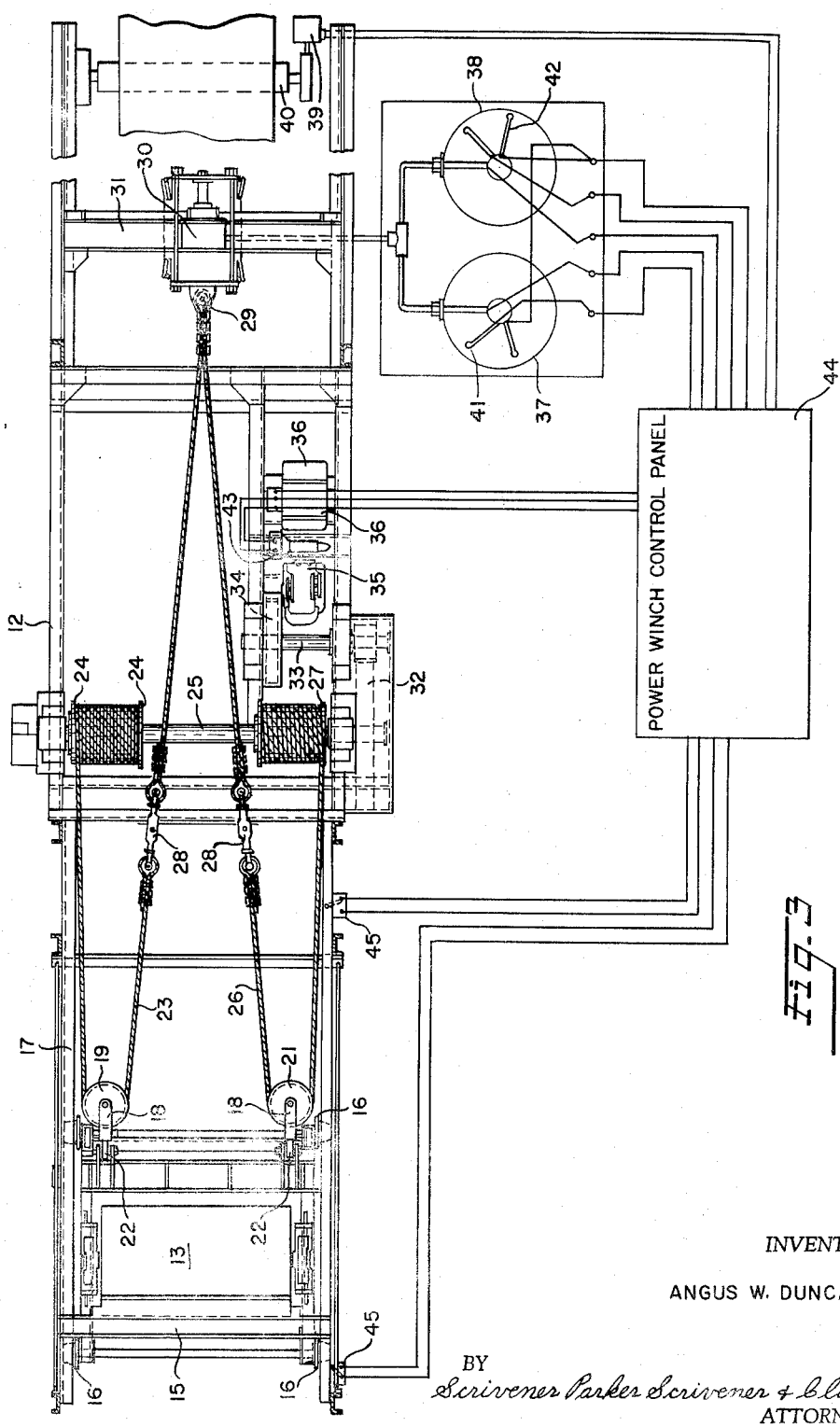
INVENTOR
ANGUS W. DUNCAN
BY *Scrivener Parker Scrivener & Clark*
ATTORNEYS

United States Patent Office 3,217,863
Patented Nov. 16, 1965

3,217,863
TENSIONING MEANS FOR BELT CONVEYORS
Angus Wellesley Duncan, Leigh Sinton, near Malvern, England, assignor to The Mining Engineering Company Limited, Worcester, England, a British company
Continuation of abandoned application Ser. No. 159,292, Dec. 14, 1961. This application Oct. 7, 1964, Ser. No. 404,553
5 Claims. (Cl. 198—208)

This application is a continuation if application Serial No. 159,292 filed December 14, 1961 and now abandoned.

This invention relates to improvements in belt conveyors and is particularly concerned with means for maintaining the correct tension in the belt of a belt conveyor under all conditions of loading and operation.

Various methods have been used for maintaining constant tension in a belt. One common and simple method is to carry a loop of the belt around two drums of which one is free to move under gravity and is suitably loaded.

My invention comprises a power-operated belt tensioning device in which a loop of the belt is carried round a movable drum coupled to an electrically driven rope winch through a block and tackle or equivalent arrangement, the anchored end of the rope being connected to load responsive means which cause the winch motor to be driven in one direction or the other according to whether the load on the rope is above or below a predetermined value by a small percentage, which may be about 5%.

One practical form of power-operated belt tensioning device in accordance with my invention is illustrated by way of example in the accompanying drawings, in which:

FIGURE 1 is a side elevation of the complete assembly showing features of the invention;

FIGURE 2 is a plan view of the arrangement of FIG. 1; and

FIGURE 3 is a plan including details of the electric circuit.

The tensioning device illustrated is employed for maintaining a substantially uniform tension in a conveyor belt supported on idler roller assemblies, indicated at 11, over a framework 12.

A loop if the belt is carried round a loop-take-up drum 13 on a shaft 14 rotatably mounted in bearings in a carriage 15 supported by rollers 16 in channel section members 17 of the framework for movement in a direction at right angles to the axis of the drum and parallel to the line of movement of the belt.

At one end of the carriage transversely spaced forks 18 in which are mounted pulleys 19, 21 are attached to the carriage by swivelling couplings 22. The pulleys are located adjacent to opposite sides of the carriage.

A rope or cable 23 carried around the pulley 19 is wound at one end on to a winch drum 24 of the scroll type keyed on a transverse shaft 25 mounted in bearings on the framework.

A second rope of cable 26 carried around the pulley 21 is wound at one end on a second winch drum 27 also keyed on the shaft 25.

The other ends of the ropes or cables are attached through adjustable rigging screws 28 to an anchorage 29 on the movable member of an hydraulic load-sensitive cell 30 mounted on a cross-section 31 of the framework.

The shaft 25 carrying the winch drums is driven through reduction gears 32 from a countershaft 33 which in turn is driven through reduction gears 34 from the output shaft of a gear-box 35 of which the input shaft is driven by an electric motor 35. A brake 43 is provided at a convenient point in the drive, as for example on the coupling between the motor and the gear box. When the conveyor is shut down the brake can be applied to lock tension in the belt.

Hydraulic pressure is transmitted from both sides of the load-sensitive cell 29 to pressure gauges 37 and 38. These gauges operate switches 41 and 42 in the electric circuit for the motor 36 to cause the motor to drive the winch shaft 25 in one direction or the other according to whether the load on the ropes or cables is above or below a predetermined value by a small percentage which may be about 5%.

The pressures at which the switches operate are adjustable so that suitable maximum and minimum belt tension loads on the drum 13 can be selected as required.

Through the switch panel the winch motor 36 and its associated brake are thus operated to move the drum 13 inbye, that is towards the winch, if the load on the drum drops below the selected minimum value, and to allow the drum to move outbye if the load exceeds the selected maximum value. The overlap can be arranged so that hunting is eliminated.

The control circuit of the winch motor also includes a centrifugally operated switch unit 39 of known type which is driven from the conevyor belt by a roller 40. This switch unit is arranged to prevent operation of the winch if the belt speed drops below a predetermined value, which may be about 75% of the full speed. The object of this feature is to avoid excessive movement of the tensioning drum which might take place with certain conveyor arrangements while the conveyor is slowing down and stopping, and the belt tensions tend to equalise themselves throughout the conveyor.

The centrifugally operated switch unit is also arranged to permit operation of the winch only in a direction to tension the belt while the conveyor is being started up, and until the belt speed has reached a predetermined value which again may be about 75% of the full speed.

The object of this feature is to prevent "hunting" of the winch during the starting up of the conveyor.

A revolution counter driven from the winch shaft 25 may be wired into the control panel 44 to prevent overwinding of the winch, and a limit switch 45 may be located at a convenient point in the path of the loop drum carriage 15 to prevent the carriage from being pulled too far towards the winch or moving too far away from it.

I claim:

1. Power-operated means for maintaining a substantially uniform tension in the belt of a belt conveyor, comprising a carraige movable in the direction of the length of the belt, a drum which is rotatably mounted in said carriage and around which a loop of the belt is carried, a rope winch, load sensitive means, a rope coupled to said carriage, one end of said rope being wound on said winch, means connecting the rope to said load-sensitive means and power means for driving said winch in one direction or the other under the control of said load-sensitive means according to whether the load on the rope is above or below a predetermined value, an electrical circuit controlling the operation of said power means, said circuit including switch means, speed-sensitive means sensitive to the speed of the belt and controlling said switch means to prevent the winch from paying out rope until the speed of the belt has reached a predetermined value, and a brake in the drive between the power means and the winch.

2. Power-operated means as in claim 1 in which said load-sensitive means comprises a load-sensitive hydraulic cell and pressure gauges controlling switches in said electrical circuit, hydraulic pressure being transmitted to said pressure gauges from opposite sides of the cell.

3. Power-operated means as in claim 2 in which the power means comprises a reversible electric motor, and further comprising reduction gearing through which the motor drives the winch drum.

4. Power-operated means as in claim 1 wherein said circuit includes a switch in the path of said carriage for limiting the movement of the carriage towards the winch.

5. Power-operated means for maintaining a substantially constant tension in the belt of a belt conveyor comprising a stationary framework, a carriage guided in said framework for movement in the direction of the length of the belt, a drum which is rotatably mounted in said carriage and around which a loop of the belt passes a shaft rotatably mounted in said framework, two spaced winch drums fixed on said shaft, two spaced pulleys mounted on said carriage, load-sensitive means mounted in said framework, a first rope passing round one of said pulleys and wound at one end on one of said drums and attached at the other end to said load-sensitive means, a second rope passing round the other of said pulleys and wound at one end on the other of said winch drums and attached at the other end to said load-sensitive means, and power means for driving said shaft and winch drums in one direction or the other under the control of the load-sensitive means according to whether the load on the ropes is above or below a predetermined value, an electrical circuit controlling the operation of said power means, said circuit including switch means, speed-sensitive means to the speed of the belt and controlling said switch means to prevent the winch from paying out rope until the speed of the belt has reached a predetermined value and a brake in the drive between the power means and the winch.

References Cited by the Examiner

UNITED STATES PATENTS

| | | | |
|---|---|---|---|
| 2,661,832 | 12/1953 | Buckeridge | 198—203 |
| 2,782,902 | 2/1957 | Sloane | 198—203 |
| 2,788,116 | 4/1957 | Wood | 198—208 X |
| 2,796,167 | 6/1957 | Thomson | 198—203 |
| 2,846,054 | 8/1958 | Bergmann | 198—40 X |
| 2,858,933 | 11/1958 | Hardy | 198—208 X |
| 2,858,935 | 11/1958 | LoPresti | 198—208 X |
| 2,862,604 | 12/1958 | Craggs et al. | 198—208 X |
| 3,027,993 | 4/1962 | Houben | 198—208 |

HUGO O. SCHULZ, *Primary Examiner.*
SAMUEL F. COLEMAN, *Examiner.*